(12) United States Patent
Komeichi et al.

(10) Patent No.: US 10,488,196 B2
(45) Date of Patent: Nov. 26, 2019

(54) LASER SCANNER SYSTEM AND REGISTRATION METHOD OF POINT CLOUD DATA

(71) Applicant: TOPCON Corporation, Tokyo-to (JP)

(72) Inventors: Takahiro Komeichi, Tokyo-to (JP); Tadayuki Ito, Tokyo-to (JP); Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 173 days.

(21) Appl. No.: 15/700,588

(22) Filed: Sep. 11, 2017

(65) Prior Publication Data

US 2018/0087901 A1 Mar. 29, 2018

(30) Foreign Application Priority Data

Sep. 27, 2016 (JP) ................................. 2016-188652

(51) Int. Cl.
| | |
|---|---|
| *G01C 11/02* | (2006.01) |
| *G01S 7/48* | (2006.01) |
| *G01C 15/00* | (2006.01) |
| *G01S 17/02* | (2006.01) |
| *G01S 17/89* | (2006.01) |

(52) U.S. Cl.
CPC .......... *G01C 11/025* (2013.01); *G01C 15/006* (2013.01); *G01S 7/4808* (2013.01); *G01S 17/023* (2013.01); *G01S 17/89* (2013.01)

(58) Field of Classification Search
USPC ........................................................ 701/408
See application file for complete search history.

(56) References Cited

U.S. PATENT DOCUMENTS

| | | | | |
|---|---|---|---|---|
| 8,310,653 B2* | 11/2012 | Ogawa | .................. | G01S 7/4812 356/28 |
| 8,638,449 B2* | 1/2014 | Ohtomo | ............... | G01C 15/002 356/4.01 |

(Continued)

FOREIGN PATENT DOCUMENTS

| | | |
|---|---|---|
| JP | 5073256 B2 | 11/2012 |
| JP | 2013-190272 A | 9/2013 |

OTHER PUBLICATIONS

European communication dated Feb. 22, 2018 in corresponding European patent application No. 17192183.6.

*Primary Examiner* — Tyler D Paige
(74) *Attorney, Agent, or Firm* — Nields, Lemack & Frame, LLC

(57) ABSTRACT

The invention provides a laser scanner system, which comprises a laser scanner which includes a distance measuring unit for receiving a reflection light of a distance measuring light from an object to be measured and performing a distance measurement, a scanning unit for rotatably irradiating the distance measuring light, a directional angle detecting unit for detecting an irradiating direction of the distance measuring light, a GNSS device, and a control arithmetic unit, wherein the laser scanner is installed at two points, and wherein the control arithmetic unit obtains global coordinates of installation positions of the laser scanner from the GNSS device respectively, scans the distance measuring light over a total circumference at each of the installation positions, acquires point cloud data of the total circumference, performs a shape matching of the two point cloud data and combines the two point cloud data.

9 Claims, 7 Drawing Sheets

(56) References Cited

U.S. PATENT DOCUMENTS

| | | | | |
|---|---|---|---|---|
| 8,643,828 B2* | 2/2014 | Ohtomo | ............... | G01C 15/002 |
| | | | | 356/3.01 |
| 9,201,422 B2* | 12/2015 | Ohtomo | ............... | G08G 5/0069 |
| 9,482,532 B2* | 11/2016 | Kumagai | ............. | G01C 15/006 |
| 9,523,574 B2* | 12/2016 | Chiba | ................ | G01C 15/002 |
| 9,633,438 B2* | 4/2017 | Tanaka | ................ | G05D 1/0246 |
| 2008/0075325 A1* | 3/2008 | Otani | ................... | G01C 15/002 |
| | | | | 382/106 |
| 2012/0169876 A1* | 7/2012 | Reichert | ................ | B60R 11/04 |
| | | | | 348/148 |
| 2012/0212588 A1* | 8/2012 | Ohtomo | ............... | G01C 15/002 |
| | | | | 348/50 |
| 2014/0163775 A1* | 6/2014 | Metzler | ............... | G01C 15/002 |
| | | | | 701/2 |
| 2014/0247439 A1* | 9/2014 | Neier | ................... | G01C 15/002 |
| | | | | 356/4.01 |
| 2015/0323672 A1* | 11/2015 | Shenkar | ................ | G01S 17/023 |
| | | | | 382/154 |
| 2016/0138919 A1* | 5/2016 | Green | .................... | G06T 17/00 |
| | | | | 348/135 |
| 2016/0146604 A1* | 5/2016 | Metzler | .................. | G01C 15/00 |
| | | | | 33/228 |
| 2016/0224927 A1* | 8/2016 | Pettersson | ............ | H04B 5/0062 |
| 2016/0314593 A1* | 10/2016 | Metzler | .................. | G06T 7/337 |
| 2017/0337743 A1* | 11/2017 | Metzler | ..................... | G06T 7/73 |

\* cited by examiner

LASER SCANNER SYSTEM AND REGISTRATION METHOD OF POINT CLOUD DATA

BACKGROUND OF THE INVENTION

The present invention relates to a laser scanner system which acquires point cloud data from a plurality of points by a laser scanner and integrates a plurality of point cloud data as point cloud data of the same coordinate system and a registration method of the point cloud data.

As a measuring instrument for acquiring three-dimensional data of an object to be measured, a laser scanner is used. The laser scanner scans a distance measuring light and acquires point cloud data of an object to be measured or a range to be measured. Based on the point cloud data as acquired, a shape and the three-dimensional data of the object to be measured can be determined.

Further, in a case where the object to be measured is a structure such as a building or the like, if a measurement is performed from one direction, point cloud data of a shaded portion cannot be acquired. For this reason, the point cloud data of the object to be measured are acquired from a plurality of points.

In a case where the point cloud data is acquired from the plurality of points, the point cloud data needs to be combined so as to become data of the same coordinate system.

Conventionally, in order to combine the point cloud data acquired from a plurality of installation points, machine reference points at each of the installation points (an installation point of a laser scanner), an instrument height, a plurality of back sight points with known coordinate values are required.

Although the machine reference points may be arbitrary, the plurality of back sight points are measured from the machine reference points, and the machine reference points are determined as a known point based on a measurement result. Further, the instrument height is a height from a ground surface of the installation point to a reference point of the laser scanner and is actually measured in an installed state.

The plurality of point cloud data are combined based on a coordinate value of each of the machine reference points, an instrument height, and a coordinate value of common back sight points.

As described above, in a conventional laser scanner system, a plurality of known back sight points, the instrument height and the machine reference points must be measured every time the laser scanner is installed. For this reason, there is a problem that a work is complicated.

SUMMARY OF THE INVENTION

It is an object of the present invention is to provide a laser scanner system and a registration method of point cloud data which facilitate an installation operation of a laser scanner or facilitate a combination of a plurality of point cloud data in a case where the point cloud data are acquired from a plurality of points.

To attain the object as described above, a laser scanner system according to the present invention comprises a laser scanner which includes a distance measuring light emitting unit for emitting a distance measuring light, a distance measuring unit for receiving a reflection light from an object to be measured and performing a distance measurement, a scanning unit for rotatably irradiating the distance measuring light, a frame unit on which the scanning unit is provided and capable of rotating horizontally, a leveling unit for leveling the frame unit, a directional angle detecting unit for detecting an irradiating direction of the distance measuring light, a GNSS device, and a control arithmetic unit, wherein the laser scanner is installed at two points, and the frame unit is leveled by the leveling unit, and wherein the control arithmetic unit obtains global coordinates of installation positions of the laser scanner from the GNSS device respectively, scans the distance measuring light over a total circumference at each of the installation positions, acquires point cloud data of the total circumference, relatively rotates two point cloud data around a vertical axis as a center, performs a shape matching of the two point cloud data and combines the two point cloud data.

Further, in the laser scanner system according to the present invention, the control arithmetic unit rotates the other of the point cloud data one round with respect to one of the point cloud data each time one of the point cloud data is rotated by a predetermined angle and performs the shape matching between one of the point cloud data and the other of the point cloud data.

Further, in the laser scanner system according to the present invention, the control arithmetic unit prepares rough point cloud data with low density from the point cloud data, performs a general matching based on the rough point cloud data, sets a detailed matching range including an error in the general matching and performs a detailed shape matching only within the detailed matching range.

Further, in the laser scanner system according to the present invention, the laser scanner has an image pickup unit, the image pickup unit acquires total circumferential images corresponding to the two point cloud data at the two points, respectively, and wherein the control arithmetic unit extracts a feature point from each of the total circumferential images, performs the general matching of the total circumferential images from the feature point, sets the detailed matching range including an error in the general matching and performs the detailed shape matching only within the detailed matching range.

Furthermore, a registration method of point cloud data according to the present invention comprises a step of installing a laser scanner including a GNSS device at two arbitrary points, a step of vertically leveling the laser scanner, a step of obtaining a global coordinate value of the laser scanner at the two points by the GNSS device, a step of acquiring point cloud data from the two points, respectively, a step of converting the point cloud data into a global coordinate system based on the global coordinate value, a step of relatively rotating the two point cloud data around a vertical axis as a center, performing a shape matching of the two point cloud data and combining the two point cloud data.

According to the present invention, the laser scanner system comprises a laser scanner which includes a distance measuring light emitting unit for emitting a distance measuring light, a distance measuring unit for receiving a reflection light from an object to be measured and performing a distance measurement, a scanning unit for rotatably irradiating the distance measuring light, a frame unit on which the scanning unit is provided and capable of rotating horizontally, a leveling unit for leveling the frame unit, a directional angle detecting unit for detecting an irradiating direction of the distance measuring light, a GNSS device, and a control arithmetic unit, wherein the laser scanner is installed at two points, and the frame unit is leveled by the leveling unit, and wherein the control arithmetic unit obtains global coordinates of installation positions of the laser scanner from the GNSS device respectively, scans the distance measuring light over a total circumference at each of the installation positions, acquires point cloud data of the total circumference, relatively rotates two point cloud data around a vertical axis as a center, performs a shape matching of the two point cloud data and combines the two point cloud data. As a result, there is no need that a directional angle of the laser scanner at the installation point is known, and a system configuration can be simplified. Further, since the shape matching of the plurality of the point cloud data is performed only by a rotation in one direction, processings can be simplified, and a speed of a registration processing can be higher.

Further, according to the present invention, the registration method of the point cloud data comprises a step of installing a laser scanner including a GNSS device at two arbitrary points, a step of vertically leveling the laser scanner, a step of obtaining a global coordinate value of the laser scanner at the two points by the GNSS device, a step of acquiring point cloud data from the two points, respectively, a step of converting the point cloud data into a global coordinate system based on the global coordinate value, a step of relatively rotating the two point cloud data around a vertical axis as a center, performing a shape matching of the two point cloud data and combining the two point cloud data. As a result, there is no need that the directional angle of the laser scanner at the installation position is known, and the system configuration can be simplified. Further, since the shape matching of the plurality of the point cloud data is performed only by the rotation in one direction, the processings can be simplified, and the speed of the registration processing can be higher.

DETAILED DESCRIPTION OF THE PREFERRED EMBODIMENT

A description will be given on an embodiment of the present invention by referring to the attached drawings.

First, by referring to FIG. 1 and FIG. 2, a description will be given on a three-dimensional laser scanner used in an embodiment of the present invention.

Figure 1:
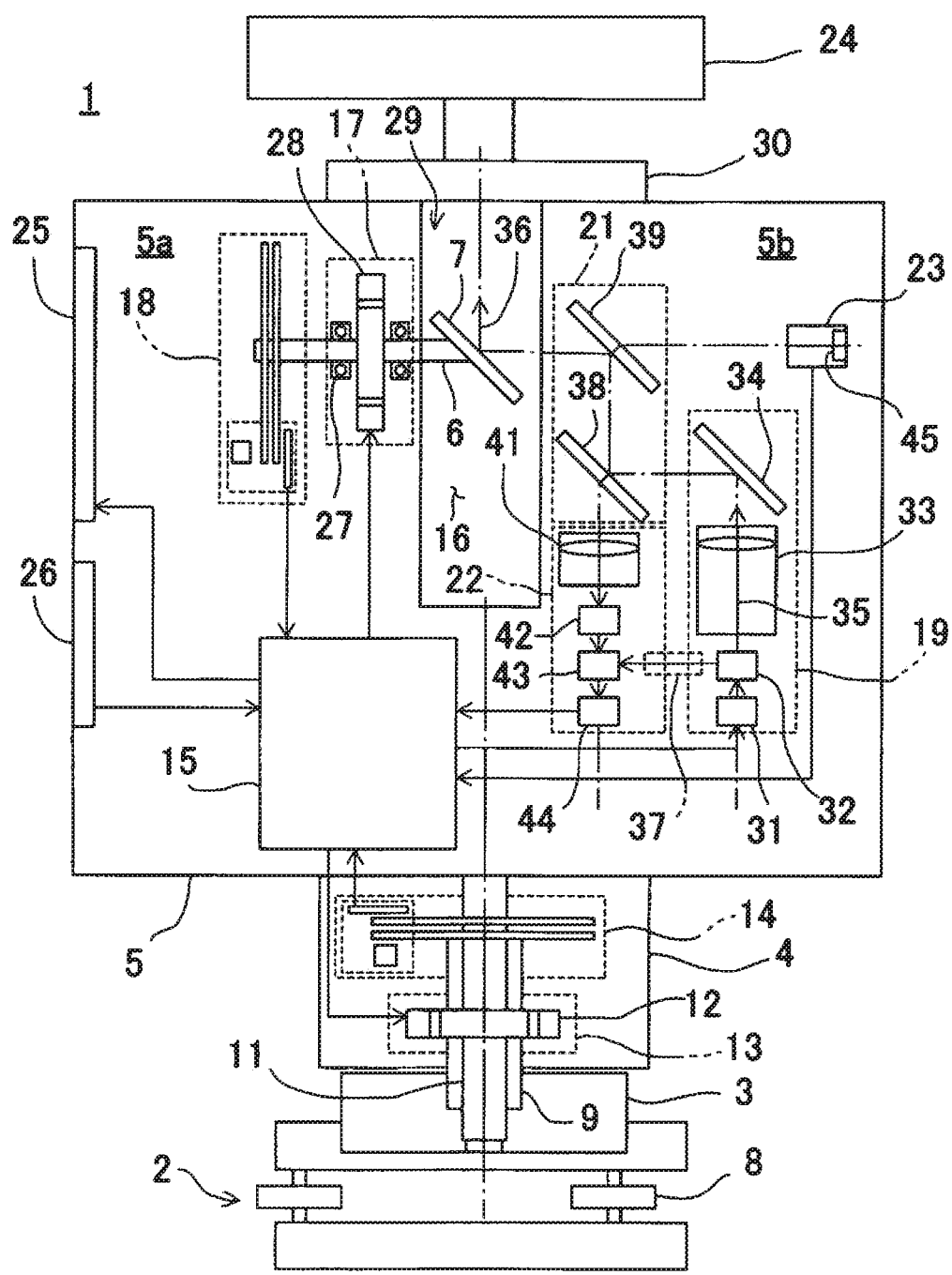
FIG. 1 is a schematical sectional elevational view of a laser scanner used in an embodiment of the present invention.
Figure 3:
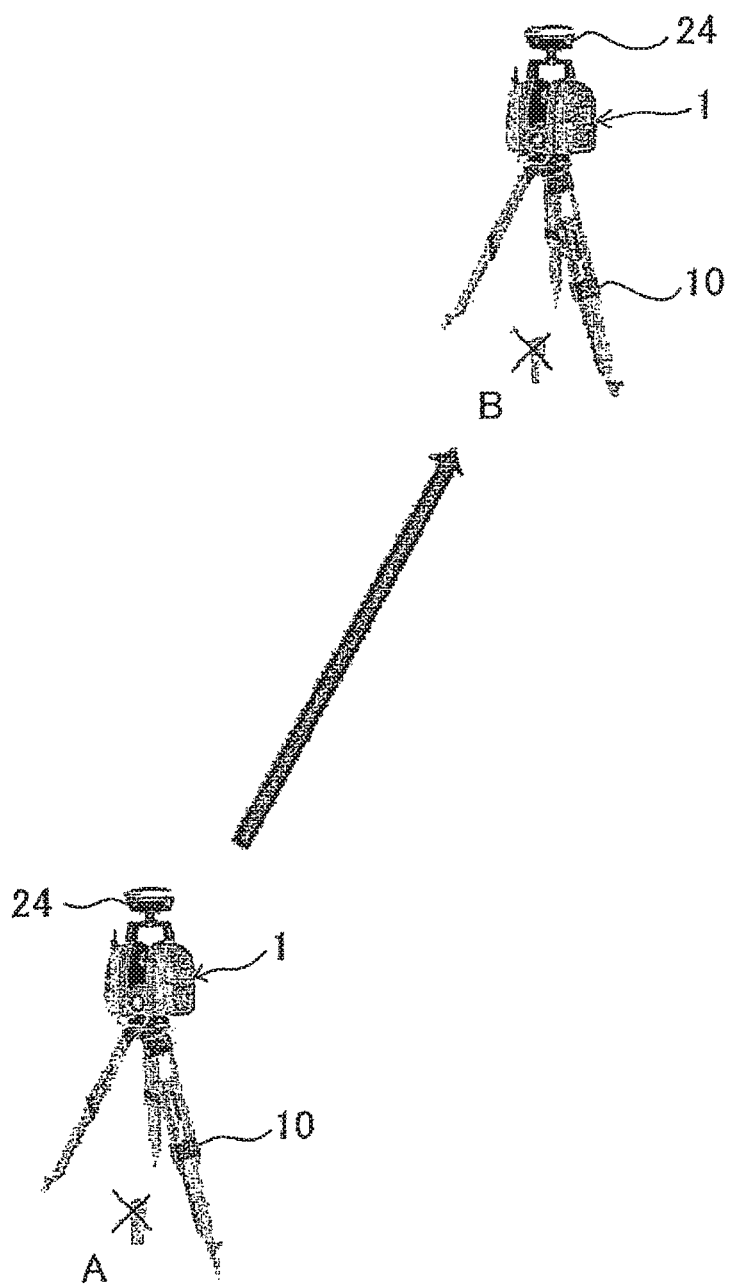
FIG. 3 is a schematical view of a system according to the embodiment of the present invention.

As shown in FIG. 1, a laser scanner 1 is installed via a tripod 10 (see FIG. 3). The laser scanner 1 comprises a leveling unit 2 attached on the tripod 10, a base unit 3 provided on the leveling unit 2, a frame unit 5 provided on the base unit 3 via a horizontal rotary unit 4 so as to be rotatable in a horizontal direction, and a scanning mirror 7 provided on the frame unit 5 so as to be rotatable around a vertical rotation shaft 6 having an axis extending horizontally as a center in a vertical direction (an elevation direction).

The leveling unit 2 has, e.g., one supporting pin (not shown) and two adjusting screws 8. When the adjusting screws 8 are adjusted so that a tilt sensor (not shown) provided on the frame unit 5 detects a horizontality, a leveling of the leveling unit 2 is performed.

The horizontal rotary unit 4 has an axis extending vertically and has a horizontal rotation shaft 11 which is rotatably and vertically supported on the base unit 3 via a bearing 9. The frame unit 5 is supported by the horizontal rotation shaft 11, and the frame unit 5 is configured to rotate together with the horizontal rotation shaft 11.

The horizontal rotary unit 4 accommodates a horizontal driving unit 13 which includes a horizontal drive motor 12, and a horizontal angle detector 14 (e.g., an encoder) which detects a rotation angle of the horizontal rotation shaft 11. The frame unit 5 is rotated around the horizontal rotation shaft 11 as the center by the horizontal drive motor 12. It is so designed that a rotation angle of the horizontal rotation shaft 11 with respect to the base unit 3, i.e., a rotation angle of the frame unit 5 is detected by the horizontal angle detector 14.

Further, a detection result (a horizontal angle) of the horizontal angle detector 14 is input to a control arithmetic unit 15 (to be described later). The control arithmetic unit 15 controls a driving of the horizontal drive motor 12 based on the detection result of the horizontal angle detector 14.

A recessed portion 16 is formed in a central portion of the frame unit 5, and rooms 5a and 5b are formed so that the rooms 5a and 5b horizontally sandwich the recessed portion 16 therebetween. A vertical driving unit 17 and a vertical angle detector 18 are accommodated in the one room 5a (a left room in the drawing). In the other room 5b (a right room in the drawing), a distance measuring light emitting unit 19, a common optical path unit 21, a distance measuring unit 22, an image pickup unit 23, or the like are accommodated. Further, at a necessary position of an inside of the frame unit 5, the control arithmetic unit 15 is accommodated. Further, on necessary portions of the frame unit 5, a display unit 25 and an operation unit 26 are provided.

The vertical rotation shaft 6 is rotatably supported on the frame unit 5 via a bearing 27. One end portion of the vertical rotation shaft 6 protrudes into the recessed portion 16, and the scanning mirror 7 is provided at a protrusion end of the vertical rotation shaft 6 in such a manner that the scanning mirror 7 tilts 45° with respect to the axis of the vertical rotation shaft 6. The scanning mirror 7 is supported in the recessed portion 16 by the vertical rotation shaft 6, and is able to freely rotate around the vertical rotation shaft 6 as the center in the vertical direction.

The axis of the vertical rotation shaft 6 is arranged so as to pass through a center of the scanning mirror 7 and coincide with a distance measuring optical axis 36 which enters the scanning mirror 7. Further, the axis of the vertical rotation shaft 6 is set so as to become orthogonal to an axis of the horizontal rotation shaft 11 at the center of the scanning mirror 7.

The vertical driving unit 17 has a vertical drive motor 28, and the vertical rotation shaft 6 is rotated by the vertical drive motor 28. Further, by the vertical drive motor 28, the scanning mirror 7 is rotated via the vertical rotation shaft 6. It is to be noted that the vertical rotation shaft 6, the scanning mirror 7, the vertical drive motor 28, or the like make up a scanning unit 29.

A GNSS (Global Navigation Satellite System) device 24 is attached on an upper surface of the frame unit 5 via an adapter 30. The adapter 30 is attached to or detached from the frame unit 5. Therefore, the GNSS device 24 can be also attached to or detached from the frame unit 5. Further, the GNSS device 24 receives a signal from an artificial satellite, performs a signal processing as required and inputs the receiving signal to a global coordinate arithmetic component 53 (to be described later). The global coordinate arithmetic component 53 calculates global coordinates based on the receiving signal.

In a case where the GNSS device 24 is attached on the frame unit 5, a reference position of the GNSS device 24 (a position of the global coordinates determined by the GNSS device 24) and a reference position of the laser scanner 1 (a reference position in a case where a distance measurement and an angle measurement are performed) have a known relation. Further, the GNSS device 24 is set so as to be positioned on the axis of the horizontal rotation shaft 11.

The distance measuring light emitting unit 19 has a distance measuring light emitter 31, an optical path splitting component 32 such as a half mirror, a beam splitter or the like, a light projecting optical component 33 constituted of an objective lens or the like, and a mirror 34. The distance measuring light emitter 31 is, e.g., a semiconductor laser or the like, and emits a pulse laser beam of an infrared light which is an invisible light on the distance measuring optical axis 36 as a distance measuring light 35.

The distance measuring optical axis 36 enters the scanning mirror 7 through the common optical path unit 21 and is deflected by the common optical path unit 21 so as to coincide with the axis of the vertical rotation shaft 6. Further, the distance measuring optical axis 36 is deflected by the scanning mirror 7 in a right angle direction so as to be directed toward an object to be measured.

The distance measuring light emitter 31 is controlled by the control arithmetic unit 15 so that a pulsed light is emitted in a state as required, e.g., a light intensity as required, a pulse interval as required, or the like.

The common optical path unit 21 has a first beam splitter 38 and a second beam splitter 39. Further, the distance measuring unit 22 has a light receiving optical component 41 constituted of a condenser lens or the like, an optical path extension component 42, an optical path coupler 43, and a photodetection element 44.

A part of the distance measuring light 35 output from the distance measuring light emitter 31 passes through the optical path splitting component 32 and enters the mirror 34 through the light projecting optical component 33. The distance measuring light 35 is reflected by the mirror 34 and led to the common optical path unit 21. Further, a remaining part of the distance measuring light 35 is reflected by the optical path splitting component 32 as an internal reference light and led to an internal reference optical path 37.

The distance measuring light 35 reflected by the mirror 34 is sequentially reflected by the first beam splitter 38 and the second beam splitter 39. The distance measuring light 35 is led to the scanning mirror 7 after being reflected by the second beam splitter 39. It is to be noted that the distance measuring light 35 passed through the first beam splitter 38 and the second beam splitter 39 is absorbed by an antireflection component (not shown).

It is to be noted that the scanning mirror 7 is a deflecting optical component, and the scanning mirror 7 reflects the distance measuring light 35 which is incident from the horizontal direction at a right angle and reflects a reflected distance measuring light, which enters the scanning mirror 7 toward the second beam splitter 39 in the horizontal direction.

The distance measuring light 35, which is led to the scanning mirror 7 from the common optical path unit 21, is reflected by the scanning mirror 7, and irradiated to an object to be measured (not shown). Further, when the scanning mirror 7 is rotated around the axis of the vertical rotation shaft 6 as the center, the distance measuring light 35 is rotatably irradiated within a vertical plane. Further, when the horizontal rotary unit 4 rotates the frame unit 5 in the horizontal direction, the distance measuring light 35 is rotatably irradiated around the axis of the horizontal rotation shaft 11 as the center in the horizontal direction. Therefore, due to a cooperation of a rotation of the scanning mirror 7 in the vertical direction and a rotation of the frame unit 5 in the horizontal direction, an entire measurement range can be scanned by the distance measuring light 35.

The reflected distance measuring light reflected at the object to be measured which exists within a scanning range enters the scanning mirror 7, is reflected by the scanning mirror 7 and enters the common optical path unit 21. The reflected distance measuring light is reflected by the second beam splitter 39, further passes through the first beam splitter 38 and is led to the distance measuring unit 22.

The distance measuring unit 22 leads the reflected distance measuring light passed through the first beam splitter 38 to the photodetection element 44. Further, the distance measuring unit 22 is configured to lead the internal reference light led by the internal reference optical path 37 to the photodetection element 44 via the optical path coupler 43.

The reflected distance measuring light passed through the first beam splitter 38 enters the light receiving optical component 41, is condensed by the light receiving optical component 41 and enters the optical path extension component 42. The reflected distance measuring light as passed through the optical path extension component 42 is received by the photodetection element 44 via the optical path coupler 43. Further, the internal reference light as passed through the internal reference optical path 37 is received by the photodetection element 44 via the optical path coupler 43.

In the photodetection element 44, the reflected distance measuring light and the internal reference light are converted into a reflected distance measuring light electric signal and an internal reference light electric signal, and are transmitted to the control arithmetic unit 15. It is so arranged that based on a time interval difference between the reflected distance measuring light electric signal and the internal reference light electric signal, the control arithmetic unit 15 determines a distance to the object to be measured (a measuring point).

The control arithmetic unit 15 calculates a three-dimensional coordinate value of the measuring point based on the distance as measured to the measuring point, the vertical angle detected by the vertical angle detector 18, and the horizontal angle detected by the horizontal angle detector 14. Further, by recording the coordinate value of the measuring point for each pulse, the control arithmetic unit 15 can acquire point cloud data with respect to the entire measurement range or with respect to the object to be measured. Further, the global coordinates of the laser scanner 1 are calculated based on the light receiving signal from the GNSS device 24, and global coordinates of the point cloud data are calculated based on the global coordinates.

The horizontal angle detector 14 and the vertical angle detector 18 make up a directional angle detecting unit which detects a direction of the distance measuring optical axis 36.

The image pickup unit 23 has an image pickup optical axis, and the image pickup optical axis coincides with the distance measuring optical axis 36 via the common optical path unit 21 and enters the scanning mirror 7. An image pickup element 45 is provided at an image forming position on the image pickup optical axis, and the image pickup element 45 is configured to output a digital image signal.

The image pickup element 45 is constituted of an aggregate of pixels, e.g., a CCD or a CMOS sensor or the like, and a position of each pixel in the image pickup element 45 can be specified. In the image pickup element 45, a background light which enters the scanning mirror 7, is reflected by the scanning mirror 7 and passes through the second beam splitter 39 is received.

Further, in a case where an image is acquired by the image pickup unit 23, a vertical angle of the scanning mirror 7 and a horizontal angle of the frame unit 5 are controlled by the control arithmetic unit 15 so that the image pickup optical axis is directed toward an object to be photographed. In this case, the rotation of the scanning mirror 7 and the rotation of the frame unit 5 are stopped or substantially stopped. Further, the distance measurement by the distance measuring unit 22 is stopped, and a light emission of the distance measuring light emitter 31 is also stopped.

Figure 2:
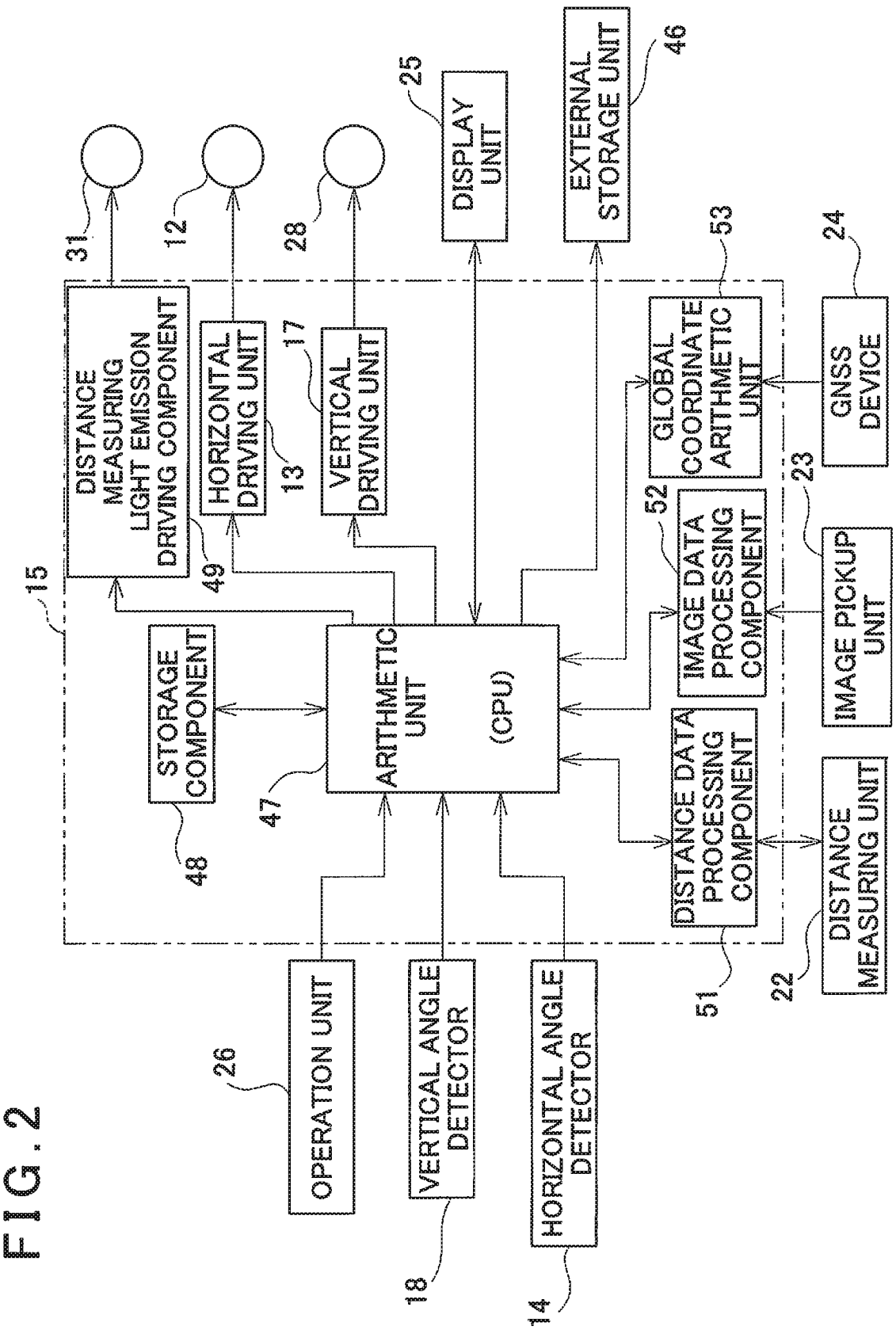
FIG. 2 is a block diagram to show an arrangement of the laser scanner.

Next, by referring to FIG. 2, a description will be give on a control system of the laser scanner 1.

The operation unit 26, the vertical angle detector 18, and the horizontal angle detector 14 are electrically connected to the control arithmetic unit 15. Angle detection signals from the vertical angle detector 18 and the horizontal angle detector 14 are input to the control arithmetic unit 15, and a signal from the operation unit 26 is input to the control arithmetic unit 15 by an operation by an operator.

The operator can perform setting conditions required to start the measurement of the laser scanner 1 from the operation unit 26, e.g., a setting of a measurement range, a setting of a point cloud data density (a pitch), a setting of an image pickup condition at a time of photographing, or the like. Further, an instruction to start a registration processing, an instruction to start a measurement (to be described later), and the like can be input. The setting conditions or the like input from the operation unit 26 can be confirmed on the display unit 25. It is to be noted that the operation unit 26 and the display unit 25 may be provided on the frame unit 5, or may be additionally independently provided, and may be remotely operatable via a signal transmission medium such as a wireless means or an infrared light, or the like.

The control arithmetic unit 15 drives the distance measuring light emitter 31, the horizontal drive motor 12 and the vertical drive motor 28, and also controls the display unit 25 for displaying an operating condition, a measurement result, or the like. Further, on the control arithmetic unit 15, an external storage device 46 such as an HDD, a memory card, a USB memory, or the like is provided. The external storage device 46 may be fixedly provided or may be detachably provided to the control arithmetic unit 15.

Next, a description will be given on general features of the control arithmetic unit 15.

The control arithmetic unit 15 has an arithmetic unit 47 as respected by a CPU, a storage component 48, a distance measuring light emission driving component 49 for controlling a light emission of the distance measuring light emitter 31, the horizontal driving unit 13 for driving and controlling the horizontal drive motor 12 and the vertical driving unit 17 for driving and controlling the vertical drive motor 28. Further, the control arithmetic unit 15 has a distance data processing component 51 for calculating distance data based on a signal acquired by the distance measuring unit 22, an image data processing component 52 for processing image data acquired by the image pickup unit 23, the global coordinate arithmetic component 53 for calculating global coordinates based on a receiving signal acquired by the GNSS device 24, and the like.

As described above, the control arithmetic unit 15 controls the horizontal driving unit 13, the vertical driving unit 17, or the like and also executes a calculation and a processing as required by various types of programs (to be described later) as a data processing device.

The storage component 48 stores the programs, such as a sequence program configured to perform the distance measurement, the measurement of a vertical angle and the measurement of a horizontal angle, a point cloud data measurement program configured to rotatably irradiate the distance measuring light, and further perform the calculation of the distance measurement, the angle measurement, or the like and acquires the point cloud data, a matching program configured to perform a shape matching of a plurality of point cloud data, a registration program configured to perform a combination processing with each point cloud data, an image pickup program configured to control an image pickup states of the image pickup unit 23, an image processing program configured to perform an image processing, an image display program configured to display data on the display unit 25, and the like, or a program configured to integrally manage these programs, and the like.

Further, the storage component 48 stores data such as the point cloud data, angle measurement data, image data, GNSS data (global coordinates), and the like.

It is to be noted that functions of the distance data processing component 51, the image data processing component 52 and the global coordinate arithmetic component 53 may be performed by the arithmetic unit 47. In this case, the distance data processing component 51, the image data processing component 52 and the global coordinate arithmetic component 53 can be omitted.

Further, the distance data processing component 51, the image data processing component 52, and the global coordinate arithmetic component 53 may be separately provided. For instance, a data processing device (e.g., a PC) is additionally provided, and the PC may perform the functions of the distance data processing component 51, the image data processing component 52 and the global coordinate arithmetic component 53. In this case, a communication means may be provided to each of the laser scanner 1 and the PC, the point cloud data, the angle measurement data, the image data and the GNSS data may be transmitted to the PC, and the PC may perform a target measurement data processing, a point cloud data processing, an angle measurement data processing, an image data processing and a GNSS data processing. It is to be noted that, as the communication means, the communication means as required, e.g., an optical communication, a wireless communication, an LAN, or the like can be adopted.

Alternatively, the external storage device 46 may be attachable to or detachable from the laser scanner 1 and the PC in common, the laser scanner 1 may store the data such as the target measurement data, the point cloud data, the angle measurement data, the image data, the GNSS data, and the like in the external storage device 46, and the data stored in the external storage device 46 may be processed by the PC. Further, the shape matching of the point cloud data and a combination (a registration) of the point cloud data may be carried out by the PC.

It is to be noted that although the image pickup unit 23 and the distance measuring unit 22 are integrally provided in the laser scanner 1, the distance measuring unit 22 may be separated and independently provided. In this case, an optical axis of the image pickup unit 23 is set in a known relation with an optical axis of the distance measuring unit 22.

Figure 4:
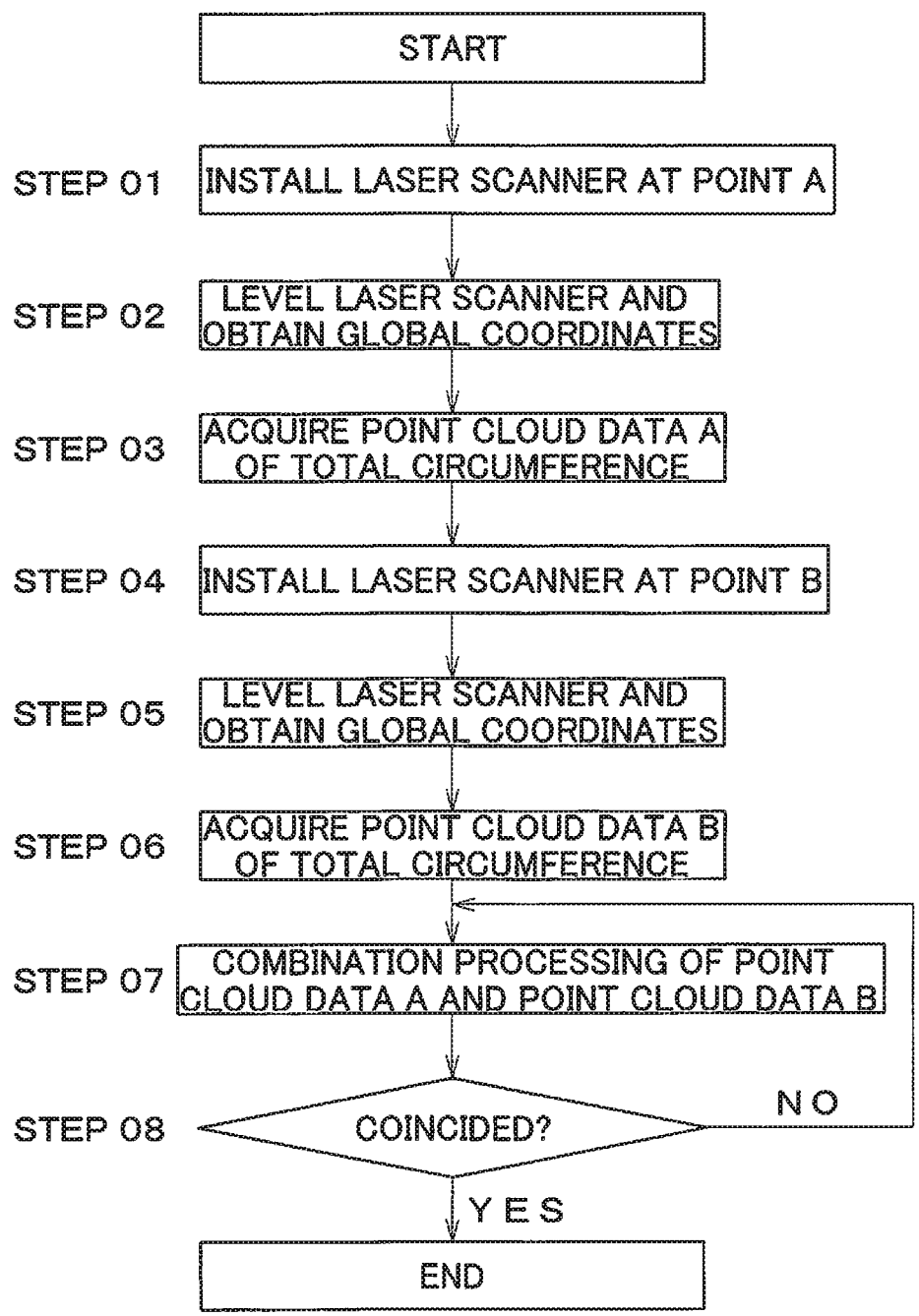
FIG. 4 is a flowchart to explain a registration method according to a first embodiment of the present invention.

Next, by referring to FIG. 3 and FIG. 4, a description will be given on a laser scanner system and a registration method according to a first embodiment of the present invention.

The laser scanner system has at least one laser scanner 1. Further, the laser scanner 1 is installed at an arbitrary position which is suitable for scanning an object to be measured (not shown). In FIG. 3, although two laser scanners 1 are shown, the laser scanner 1 is actually installed at a point A, and then installed at a point B after the measurement as required is completed.

It is to be noted that the laser scanner 1 does not have a mechanism for measuring an azimuth angle such as a compass, or the like. Therefore, when the laser scanner 1 is installed at the point A or the point B, a direction of the laser scanner 1 is unknown, and a direction of the point B with respect to the point A and the direction of the point A with respect to the point B are unknown.

(Step 01) First, the laser scanner 1 is installed at the point A which is an arbitrary position.

(Step 02) When the laser scanner 1 is installed, a leveling unit 2 levels the laser scanner 1 so that an axis of a horizontal rotation shaft 11 becomes vertical. Further, an installation position of the laser scanner 1 is determined by the GNSS device 24, and global coordinates (GNSS data) of the laser scanner 1 are obtained. Here, an operation such as a measurement of an instrument height of the laser scanner 1, or the like is omitted.

(Step 03) When a leveling of the laser scanner 1 and an obtainment of the global coordinates at the point A are completed, a point cloud data measurement program is performed by a control arithmetic unit 15. A distance measuring light is irradiated at a predetermined pulse interval from a distance measuring light emitting unit 19, and a scanning mirror 7 is rotated at a predetermined rotation speed. Further, by rotating a frame unit 5 at the predetermined rotation speed, the distance measuring light is scanned over a total circumference. By rotating the frame unit 5 one round (360°), point cloud data A which is point cloud data of the total circumference including an object to be measured at point A is acquired. Further, global coordinates of the point cloud data A are calculated by the control arithmetic unit 15 based on the global coordinates of the point A.

It is to be noted that, when the point cloud data A is acquired, in a case where the point cloud data of an upper side is unnecessary, the GNSS device 24 need not to be removed. On the other hand, in a case where the point cloud data of the upper side of, e.g., a tunnel, or the like is necessary, the GNSS device 24 is removed.

(Step 04) When the point cloud data A at the point A is acquired, the laser scanner 1 is moved from the point A to the point B.

(Step 05) When the laser scanner 1 is installed, the leveling unit 2 levels the laser scanner 1 so that the axis of the horizontal rotation shaft 11 becomes vertical. Further, the installation position of the laser scanner 1 is determined by the GNSS device 24, and the global coordinates of the laser scanner 1 are obtained.

(Step 06) When a leveling of the laser scanner 1 and an obtainment of the global coordinates at the point B are completed, a point cloud data measurement program is performed by the control arithmetic unit 15, and point cloud data B which is point cloud data of the total circumference including the object to be measured at the point B is acquired. Further, global coordinates of the point cloud data B are calculated by the control arithmetic unit 15 based on the global coordinates of the point B.

(Step 07) Finally, a registration program is performed by the control arithmetic unit 15, and a combination (a registration) processing of the point cloud data A and the point cloud data B is performed. It is to be noted that the combination processing of the point cloud data A and the point cloud data B may be performed by a PC provided additionally.

In the registration processing, a shape matching between the point cloud data A and the point cloud data B is performed. For instance, in a state where the point cloud data B is rotated by 1° around a vertical axis as a center, the point cloud data A is rotated one round around the vertical axis as the center. Alternatively, in a state where the point cloud data A is rotated by 1° around the vertical axis as the center, the point cloud data B is rotated one round around the vertical axis as the center.

It is to be noted that a rotation angle of the point cloud data B or the point cloud data A at which the point cloud data A or the point cloud data B are rotated per each one round is not limited to 10. The rotation angle is adequately set according to an accuracy as required, e.g., 0.1°, 5°, or the like.

(Step 08) In a process of rotating the point cloud data A one round, the control arithmetic unit 15 judges whether there is an object in common to the point cloud data A and the point cloud data B, for instance whether there is a case where a point cloud shape (irregularities) of the object to be measured in the point cloud data A coincides with a point cloud shape of the object to be measured in the point cloud data B.

It is to be noted that the point cloud data A and the point cloud data B are the point cloud data acquired in a state where the axis of the horizontal rotation shaft 11 of the laser scanner 1 becomes vertical, respectively. Therefore, when the shape matching between the point cloud data is performed, it would suffice if only the point cloud data is rotated around the vertical axis as the center.

In a case where the point cloud shapes of the objects to be measured do not coincide with each other, processings of Step 07 and Step 08 are performed again. That is, in a state where the point cloud data B is rotated further by 1° around the vertical axis as the center, the point cloud data A is rotated one round around the vertical axis as the center. Further, in a process of rotating the point cloud data A one round, the control arithmetic unit 15 judges again whether there is a case where the point cloud shapes of the objects to be measured coincide with each other.

Each time the point cloud data B is rotated by a predetermined angle, the point cloud data A is rotated one round, and Step 07 and Step 08 are repeated until the point cloud shape of the object to be measured in the point cloud data A coincides with the point cloud shape of the object to be measured in the point cloud data B. At a time which the point cloud shapes of the objects to be measured of the point cloud data A and the point cloud data B coincide with each other, the shape matching between the point cloud data A and the point cloud data B is completed. Further, after the shape matching, the point cloud data A and the point cloud data B are combined (the registration).

As described above, in the first embodiment, in a manner that the point cloud data of the total circumference is acquired at the point A and the point B, respectively, the point cloud data A and the point cloud data B are relatively rotated and the shape matching of the point cloud data of the object in common to each of the point cloud data is performed, the registration of the point cloud data A and the point cloud data B is performed.

Therefore, when the registration of the point cloud data A and the point cloud data B is performed, an azimuth angle of the laser scanner 1 installed at the point A and the point B need not to be known. Further, there is no need to provide a target which can be measured in common from the point A and point B for shape matching. Therefore, a device configuration and a system configuration can be simplified.

Further, since the installation position (a global coordinate value) of the laser scanner 1 can be singularly obtained by the GNSS device 24, it would suffice if the installation position of the laser scanner 1 is arbitrary, and even if the laser scanner 1 is installed at a plurality of points, it would suffice if only a measurement environment is considered. Therefore, a limitation on an installation can be extremely reduced.

Further, the point cloud data A and the point cloud data B are acquired respectively in a state where the laser scanner 1 is leveled, and the axis of the horizontal rotation shaft 11 becomes vertical. Therefore, the shape matching of the point cloud data A and the point cloud data B can be performed only by horizontally rotating the point cloud A and the point cloud B around the vertical axis as the center, respectively. That is, since the registration is performed only by a rotation in one direction, an operation such as a measurement of an instrument height or the like can be omitted, and processings can be simplified. Therefore, a speed of the registration processing can be higher.

Figure 5:
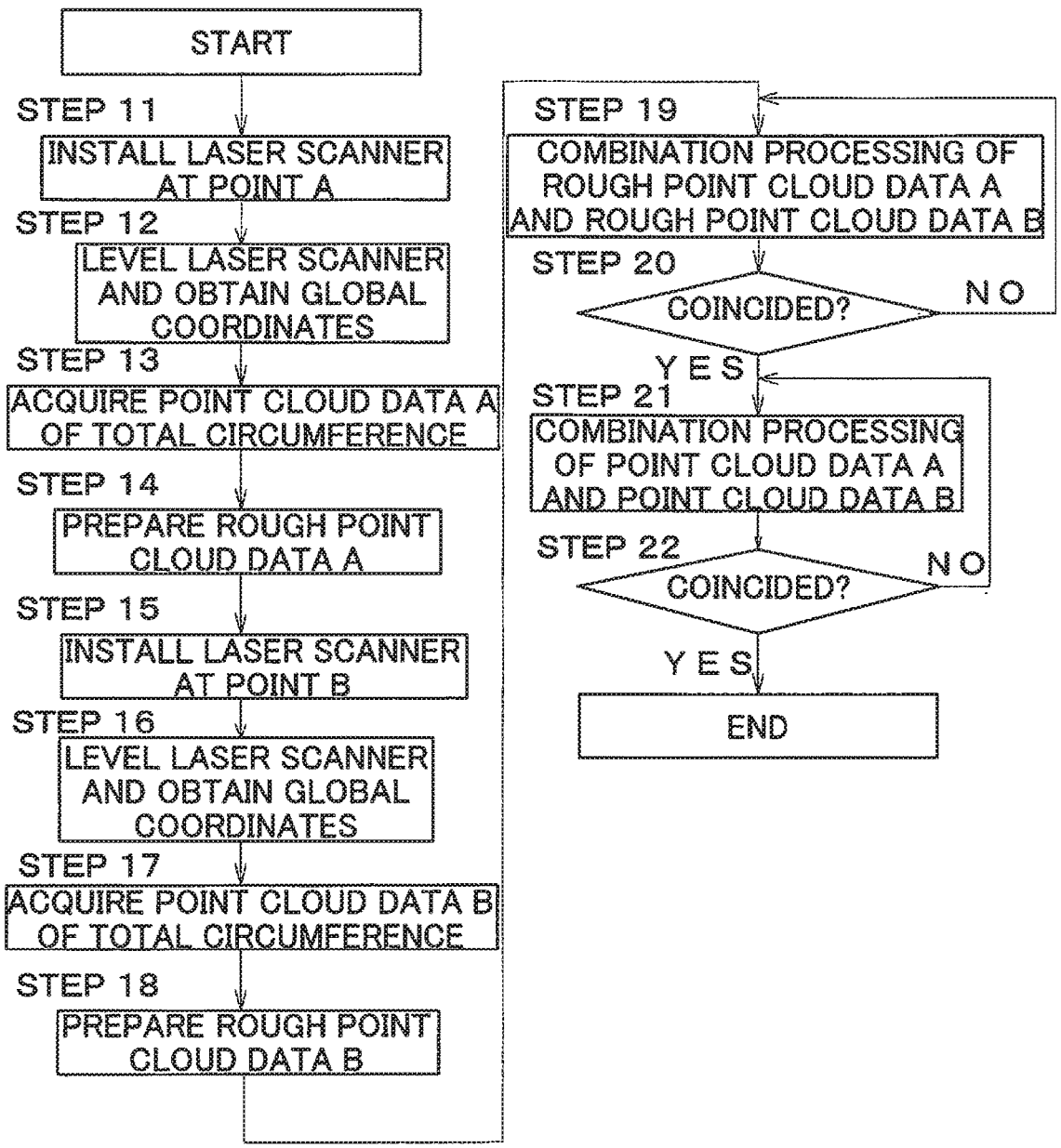
FIG. 5 is a flowchart to explain a registration method according to a second embodiment of the present invention.

Next, by referring to a flowchart in FIG. 5, a description will be given on a registration method according to a second embodiment of the present invention. It is to be noted that, in the second embodiment, since a configuration of a laser scanner 1 (see FIG. 1) and a laser scanner system is the same as the first embodiment, a detailed description thereof will be omitted.

(Step 11, Step 12) The laser scanner 1 is installed at a point A which is an arbitrary position, and the laser scanner 1 is leveled so that an axis of a horizontal rotation shaft 11 (see FIG. 1) becomes vertical. Further, an installation position of the laser scanner 1 is determined by the GNSS device 24 (see FIG. 1), and global coordinates of the laser scanner 1 are obtained.

(Step 13) Next, a point cloud data measurement program is performed by a control arithmetic unit 15 (see FIG. 1), and point cloud data A which is point cloud data of a total circumference including an object to be measured at the point A is acquired by scanning a distance measuring light over the total circumference. It is to be noted that the point cloud data A is precise point cloud data with high density (high resolution). Further, the control arithmetic unit 15 calculates global coordinates of the point cloud data A based on global coordinates of the point A.

(Step 14) After the point cloud data A is acquired, the control arithmetic unit 15 compares each point of the point cloud data A with points in a periphery and prepares rough point cloud data A of the total circumference with low density (low resolution) by thinning out a point on which a comparison result exceeds an allowable value or by thinning out a point at a predetermined interval from the point cloud data A, or the like. Alternatively, it may be so arranged that the rough point cloud data A is acquired by adjusting a pulse interval of the distance measuring light or the like and scanning over the total circumference again in a state with an enlarged scanning interval.

(Step 15, Step 16) When the point could data A and the rough point cloud data A at the point A are acquired, the laser scanner 1 is moved from the point A to the point B. Further, the laser scanner 1 is leveled so that the axis of the horizontal rotation shaft 11 becomes vertical, and the global coordinates of the laser scanner 1 are obtained.

(Step 17) A point cloud data measurement program is performed by the control arithmetic unit 15, and point cloud data B which is point cloud data of the total circumference including the object to be measured at the point B is acquired. It is to be noted that the point cloud data B is precise point cloud data with high density (high resolution). Further, the control arithmetic unit 15 calculates global coordinates of the point cloud data B based on global coordinates of the point B.

(Step 18) After the point cloud data B is acquired, rough point cloud data B is prepared by thinning out point clouds of the point cloud data B, or the rough point cloud data B with low density (low resolution) is acquired by scanning over the total circumference again in a state with the enlarged scanning interval.

(Step 19) Next, a matching program is performed by the control arithmetic unit 15, and a shape matching processing of the rough point cloud data A and the rough point cloud data B is performed. For instance, in a state where the rough point cloud data B is rotated around the vertical axis as the center by a predetermined angle such as a rotation angle as set according to as accuracy as required, e.g., 0.1°, 1°, 5°, or the like, the rough point cloud data A is rotated one round (360°) around the vertical axis as the center.

(Step 20) In a process of rotating the rough point cloud data A one round, the control arithmetic unit 15 judges whether there is a case where a point cloud shape of the object to be measured in the rough point cloud data A coincides with a point cloud shape of the object to be measured in the rough point cloud data B, for instance.

In a case where the point cloud shapes of the objects to be measured do not coincide with each other, processings of Step 19 and Step 20 are performed again. That is, in a state where the rough point cloud data B is further rotated by a predetermined angle around the vertical axis as the center, the rough point cloud data A is rotated one round around the vertical axis as the center. Further, in a process of rotating the rough point cloud data A one round, the control arithmetic unit 15 judges again whether there is a case where the point cloud shapes of the objects to be measured coincide with each other.

It is to be noted that it may be so configured that the rough point cloud data B is rotated one round, the rough point cloud data A and the rough point cloud data B are compared for the total circumference, and a position where a residual between the rough point cloud data A and the rough point cloud data B becomes minimum is selected.

Since the rough point cloud data A and the rough point cloud data B are point could data with low point cloud density, a calculation time per once of a comparison processing at Step 20 can be shortened, and the shape matching can be completed in a short time. On the other hand, since the rough point cloud data A and the rough point cloud data B are the point cloud data with low point cloud density, a result of the shape matching includes an error, and there is a case where a registration cannot be performed accurately.

Therefore, in the second embodiment, Step 19 and Step 20 are general matching processings for narrowing down a range where the shape matching of the point cloud data A and the point cloud data B with high density is performed. The control arithmetic unit 15 sets a detailed matching range including an error in the general matching processings mainly around a shape matching result of the general matching processings.

(Step 21) When the general matching processing is finished, the control arithmetic unit 15 finally performs a registration program and performs a combination (a registration) processing between the point cloud data A and the point cloud data B which are precise point cloud data.

In a state where the point cloud data B is rotated around the vertical axis as the center by a predetermined angle, e.g., the same rotation angle as the general matching processing at Step 19, the point cloud data A is rotated one round (360°) around the vertical axis as the center. It is to be noted that the point cloud data B is configured to be rotated only within the detailed matching range based on the general matching processing performed previously.

(Step 22) In a process of rotating the point cloud data A one round, the control arithmetic unit 15 judges whether there is a case where a point cloud shape of the object to be measured in the point cloud data A coincides with a point cloud shape of the object to be measured in the point cloud data B, for instance.

In a case where the point cloud shapes of the objects to be measured do not coincide with each other, processings of Step 21 and Step 22 are performed again. That is, in a state where the point cloud data B is further rotated by a predetermined angle around the vertical axis as the center, the point cloud data A is rotated one round around the vertical axis as the center. Further, in a process of rotating the point cloud data A one round, the control arithmetic unit 15 judges again whether there is a case where the point cloud shapes of the objects to be measured coincide with each other.

Step 21 and Step 22 are repeated until the point cloud shapes of each of the objects to be measured coincide with each other, and at a time which the point cloud shapes of the objects to be measured coincide with each other, a detailed shape matching between the point cloud data A and the point cloud data B is completed. Further, after the shape matching, the point cloud data A and the point cloud data B are combined (the registration).

In the second embodiment, after a general matching is performed between the rough point cloud data A and the rough point cloud data B with low point cloud density, the detailed shape matching is performed between the point cloud data A and the point cloud data B with high point cloud density, and the registration is performed.

Therefore, a range for performing the detailed shape matching can be promptly narrowed down by the general shape matching, and it would suffice if the detailed shape matching is performed only within a detailed matching range. As a result, a speed of a registration processing can be higher.

It is to be noted that, in the second embodiment, although the shape matching is performed in two stages, that is, the shape matching between the rough point cloud data and the shape matching between the point cloud data, it may be so configured that the shape matching in three stages by the point cloud data with low density (low resolution), the point cloud data with medium density (medium resolution) and the point cloud data with high density (high resolution) is performed so that the range for performing the detailed shape matching is sequentially narrowed down. Further, it is needless to say that the shape matching may be performed in four stages or more.

Figure 6:
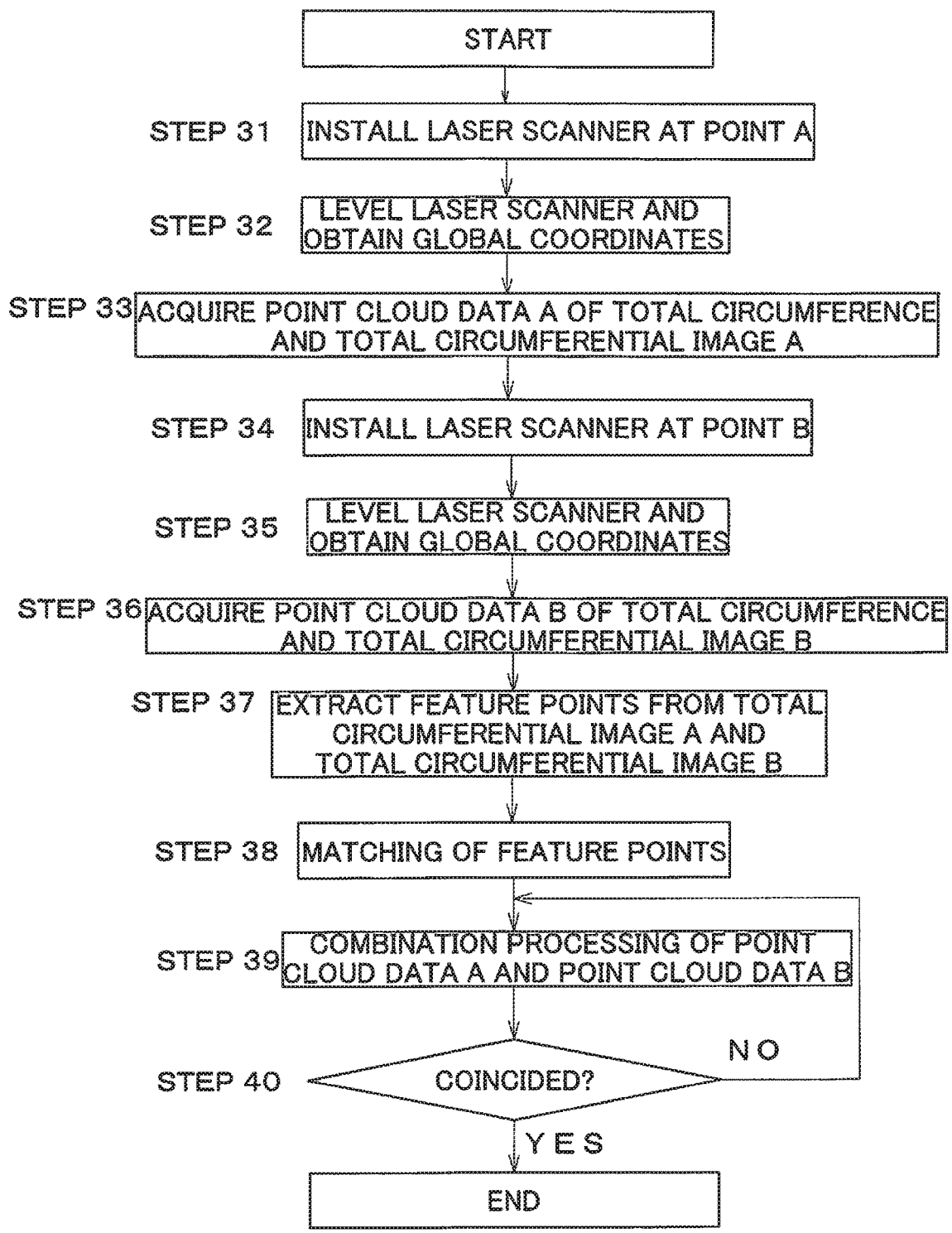
FIG. 6 is a flowchart to explain a registration method according to a third embodiment of the present invention.

Next, by referring to a flowchart in FIG. 6, a description will be given on a registration method according to a third embodiment of the present invention. It is to be noted that, in the third embodiment, since a configuration of a laser scanner 1 (see FIG. 1) and a laser scanner system is the same as the first embodiment, a detailed description thereof will be omitted.

(Step 31, Step 32) The laser scanner 1 is installed at a point A which is an arbitrary position, and the laser scanner 1 is leveled so that an axis of a horizontal rotation shaft 11 (see FIG. 1) becomes vertical. Further, an installation position of the laser scanner 1 is determined by the GNSS device 24 (see FIG. 1), and global coordinates of the laser scanner 1 are obtained.

(Step 33) Next, a point cloud data measurement program is performed by a control arithmetic unit 15 (see FIG. 1), a distance measuring light is scanned over a total circumference, and point cloud data A which is point cloud data of the total circumference including an object to be measured at a point A is acquired. Further, the control arithmetic unit 15 calculates global coordinates of the point cloud data A based on global coordinates of the laser scanner 1 at the point A.

Further, after the point cloud data A is acquired, the control arithmetic unit 15 performs an image pickup program. By performing the image pickup program, the image pickup unit 23 (see FIG. 2) acquires a total circumferential image A including the object to be measured at the point A. It is to be noted that since an image pickup optical axis of the image pickup unit 23 and a distance measuring optical axis 36 (see FIG. 1) of a distance measuring unit 22 (see FIG. 1) are configured to coincide with each other through a common optical path unit 21 (see FIG. 1), a relation between the point cloud data A and the total circumferential image A is known.

(Step 34, Step 35) When the point cloud data A and the total circumferential image A at the point A are acquired, the laser scanner 1 is moved from the point A to a point B. Further, at the point B, the laser scanner 1 is leveled so that the axis of the horizontal rotation shaft 11 becomes vertical, and the global coordinates of the laser scanner 1 are obtained.

(Step 36) The point cloud data measurement program is performed by the control arithmetic unit 15, and point cloud data B of the total circumference including the object to be measured at the point B is acquired. Further, the control arithmetic unit 15 calculates global coordinates of the point cloud data B based on global coordinates of the point B. Further, after the point cloud data B is acquired, the image pickup program is performed by the control arithmetic unit 15, and a total circumferential image B including the object to be measured at the point B is acquired. It is to be noted that, since the image pickup optical axis and the distance measuring optical axis 36 coincide with each other, a relation between the point cloud data B and the total circumferential image B is known.

(Step 37) Next, the control arithmetic unit 15 extracts a feature point of the object to be measured from the total circumferential image A and the total circumferential image B, for instance.

(Step 38) When the feature point of the object to be measured is extracted from the total circumferential image A and the total circumferential image B, the control arithmetic unit 15 performs an image matching between the total circumferential image A and the total circumferential image B based on the feature point as extracted.

(Step 39) The control arithmetic unit 15 narrows down a range for a shape matching between the point cloud data A and the point cloud data B based on a matching result between the total circumferential image A and the total circumferential image B. That is, the image matching between the total circumferential images is a general matching processing which is a preliminary stage of a detailed shape matching. Further, the control arithmetic unit 15 sets a detailed matching range including an error in the general matching processing mainly around a shape matching result of the general matching processing and performs a combination (a registration) processing between the point cloud data A and the point cloud data B within the detailed matching range.

In a state where the point cloud data B is rotated around a vertical axis as the center by a predetermined angle, e.g., by 1°, the point cloud data A is rotated one round (360°) around the vertical axis as a center. It is to be noted that the point cloud data B is configured to rotate only within a range narrowed down by the image matching as performed previously.

(Step 40) In a process of rotating the point cloud data A one round, the control arithmetic unit 15 judges whether there is a case where a point cloud shape of the object to be measured in the point cloud data A coincides with a point cloud shape of the object to be measured in the point cloud data B, for instance.

In a case where the point cloud shapes of the objects to be measured do not coincide with each other, processings of Step 39 and Step 40 are performed again. That is, in a state where the point cloud data B is further rotated by 1° around the vertical axis as the center, the point cloud data A is rotated one round around the vertical axis as the center. Further, in the process of rotating the point cloud data A one round, the control arithmetic unit 15 judges again whether there is a case where the point cloud shapes of the objects to be measured coincide with each other.

Step 39 and Step 40 are repeated until the point cloud shapes of each of the objects to be measured coincide with each other, and at a time which the point cloud shapes of the objects to be measured coincide with each other, a detailed shape matching between the point cloud data A and the point cloud data B is completed. Further, after the shape matching, the point cloud data A and the point cloud data B are combined (the registration).

In the third embodiment, after image matching is performed between the total circumferential image A acquired at the point A and the total circumferential image B acquired at the point B, the detailed shape matching is performed between the point cloud data A and the point cloud data B, and the registration is performed.

Therefore, a range for performing the detailed shape matching can be narrowed down by the image matching, and it would suffice if the detailed shape matching is performed only within a detailed matching range. As a result, a speed of a registration processing can be higher.

Figure 7:
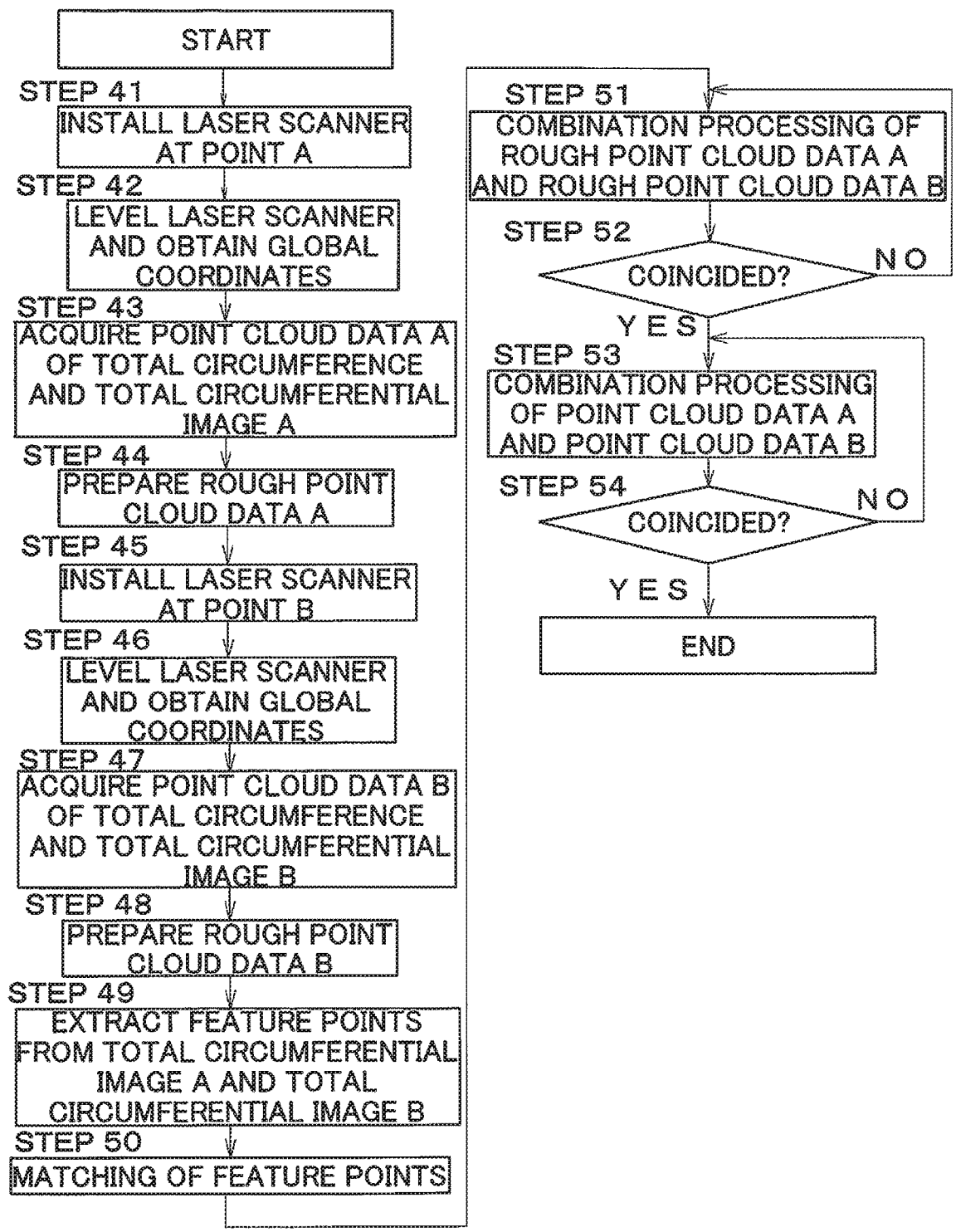
FIG. 7 is a flowchart to explain a registration method according to a fourth embodiment of the present invention.

Next, by referring to a flowchart in FIG. 7, a description will be given on a registration method according to a fourth embodiment of the present invention. It is to be noted that, in the fourth embodiment, since a configuration of a laser scanner 1 (see FIG. 1) and a laser scanner system is the same as the first embodiment, a detailed description thereof will be omitted.

(Step 41, Step 42) The laser scanner 1 is installed at a point A which is an arbitrary position, and the laser scanner 1 is leveled so that an axis of a horizontal rotation shaft 11 (see FIG. 1) becomes vertical. Further, an installation position of the laser scanner 1 is determined by the GNSS device 24 (see FIG. 1), and global coordinates of the laser scanner 1 are obtained.

(Step 43) Next, a point cloud data measurement program is performed by a control arithmetic unit 15 (see FIG. 1), a distance measuring light is scanned over a total circumference, and point cloud data A with high density (high resolution) which is point cloud data of the total circumference including an object to be measured at a point A is acquired. Further, the control arithmetic unit 15 calculates global coordinates of the point cloud data A based on global coordinates of the laser scanner 1 at the point A.

Further, after the point cloud data A is acquired, an image pickup program is performed by the control arithmetic unit 15, and an image pickup unit 23 (see FIG. 2) acquires a total circumferential image A including the object to be measured at the point A.

(Step 44) After the point cloud data A and the total circumferential image A are acquired, rough point cloud data A is prepared by thinning out point clouds of the point cloud data A, or the rough point cloud data A with low density (low resolution) is acquired by scanning over the total circumference again in a state with an enlarged scanning interval.

(Step 45, Step 46) Next, the laser scanner 1 is moved from the point A to a point B. Further, at the point B, the laser scanner 1 is leveled so that the axis of the horizontal rotation shaft 11 becomes vertical, and the global coordinates of the laser scanner 1 are acquired.

(Step 47) A point cloud data measurement program is performed by the control arithmetic unit 15, and point cloud data B with high density (high resolution) of the total circumference including the object to be measured at the point B is acquired. Further, the control arithmetic unit 15 calculates global coordinates of the point cloud data B based on global coordinates of the point B. Further, after the point cloud data B is acquired, an image pickup program is performed by the control arithmetic unit 15, and a total circumferential image B including the object to be measured at the point B is acquired.

(Step 48) After the point cloud data B and the total circumferential image B are acquired, rough point cloud data B is prepared by thinning out point clouds of the point cloud data B, or the rough point cloud data B with low density (low resolution) is acquired by scanning over the total circumference again in a state with an enlarged scanning interval.

(Step 49) Next, the control arithmetic unit 15 extracts a feature point of the object to be measured from the total circumferential image A and the total circumferential image B, for instance.

(Step 50) When the feature point of the object to be measured is extracted from the total circumferential image A and the total circumferential image B, the control arithmetic unit 15 performs an image matching between the total circumferential image A and the total circumferential image B based on the feature point as extracted. It is to be noted that the image matching between the total circumferential image A and the total circumferential image B is a first general matching processing which is a preliminary stage of a shape matching between the rough point cloud data A and the rough point cloud data B. Further, the control arithmetic unit 15 sets a general matching range including an error in the first general matching processing mainly around a matching result of the first general matching processing.

(Step 51) In a state where the rough point cloud data B is rotated around a vertical axis as the center by a predetermined angle, e.g., by 1°, the control arithmetic unit 15 rotates the rough point cloud data A one round (360°) around the vertical axis as the center. It is to be noted that the rough point cloud data B is configured to rotate only within the general matching range narrowed down by the first general matching processing as performed previously.

(Step 52) In a process of rotating the rough point cloud data A one round, the control arithmetic unit 15 judges whether there is a case where a point cloud shape of the object to be measured in the rough point cloud data A coincide with a point cloud shape of the object to be measured in the rough point cloud data B, for instance.

In a case where the point cloud shapes of the objects to be measured do not coincide with each other, processings of Step 51 and Step 52 are performed again. That is, in a state where the rough point cloud data B is further rotated by 1° around the vertical axis as the center, the rough point cloud data A is rotated one round around the vertical axis as the center. Further, in the process of rotating the rough point cloud data A one round, the control arithmetic unit 15 judges again whether there is a case where the point cloud shapes of the objects to be measured coincide with each other.

It is to be noted that the shape matching between the rough point cloud data A and the rough point cloud data B is a second general matching processing which is a preliminary stage of the shape matching between the point cloud data A and the point cloud data B. Further, the control arithmetic unit 15 sets a detailed matching range including an error in the second general matching processing mainly around a matching result of the second general matching processing. It is to be noted that the detailed matching range is narrower than the general matching range.

(Step 53) When the second general matching processing is finished, the control arithmetic unit 15 performs a registration program and performs a combination (a registration) processing between the point cloud data A and the point cloud data B which are precise point cloud data.

In a state where the point cloud data B is rotated around the vertical axis as the center by a predetermined angle, e.g., by 1° similarly to the second general matching processing, the point cloud data A is rotated one round (360°) around the vertical axis as the center. It is to be noted that the point cloud data B is configured to rotate only within the detailed matching range narrowed down by the second general matching processing as performed previously.

(Step 54) In a process of rotating the point cloud data A one round, the control arithmetic unit 15 judges whether there is a case where a point cloud shape of the object to be measured in the point cloud data A coincide with a point cloud shape of the object to be measured in the point cloud data B, for instance.

In a case where the point cloud shapes of the objects to be measured do not coincide with each other, processings of Step 53 and Step 54 are performed again. That is, in a state where the point cloud data B is further rotated by 1° around the vertical axis as the center, the point cloud data A is rotated one round around the vertical axis as the center. Further, in the process of rotating the point cloud data A one round, the control arithmetic unit 15 judges again whether there is a case where the point cloud shapes of the objects to be measured coincide with each other.

Step 53 and Step 54 are repeated until the point cloud shapes of each of the objects to be measured coincide with each other, and at a time which the point cloud shapes of the objects to be measured coincide with each other, a detailed shape matching between the point cloud data A and the point cloud data B is completed. Further, after the shape matching, the point cloud data A and the point cloud data B are combined (the registration).

In the fourth embodiment, after the first general matching between the total circumferential image A and the total circumferential image B and the second general matching between the rough point cloud data A and the rough point cloud data B with low point cloud density are performed, the detailed shape matching is performed between the point cloud data A and the point cloud data B with high point cloud density, and the registration is performed.

Therefore, a range for preparing the shape matching is sequentially narrowed down by the first general matching and the second general matching, and it would suffice if the detailed shape matching is performed only within the detailed matching range. As a result, a speed of the registration processing can be further higher.

It is to be noted that, in the second embodiment to the fourth embodiment, although it is so configured that the control arithmetic unit 15 automatically narrows down the range for performing the detailed shape matching and the detailed shape matching is performed within the detailed matching range, a setting of the detailed matching range, that is, the general matching may be visually performed manually by an operator.

Further, in the second embodiment to the fourth embodiment, various types of processings such as a preparation processing of the rough point cloud data, an extraction and a matching processing of a feature point, a registration processing and the like may be performed by an external device such as a PC, or the like.

Further, in the second embodiment to the fourth embodiment, although the laser scanner 1 is moved to the point B after the laser scanner 1 is installed at the point A, the laser scanner 1 may be installed at the point A and the point B, respectively.

The invention claimed is:

1. A laser scanner system comprising: a laser scanner which includes a distance measuring light emitting unit for emitting a distance measuring light, a distance measuring unit for receiving a reflection light from an object to be measured and performing a distance measurement, a scanning unit for rotatably irradiating said distance measuring light, a frame unit on which said scanning unit is provided and capable of rotating horizontally, a leveling unit for leveling said frame unit, a directional angle detecting unit for detecting an irradiating direction of said distance measuring light, a GNSS device, and a control arithmetic unit, wherein said laser scanner is installed at two points, and said frame unit is leveled by said leveling unit, and wherein said control arithmetic unit obtains global coordinates of installation positions of said laser scanner from said GNSS device respectively, scans said distance measuring light over a total circumference at each of the installation positions, acquires point cloud data of the total circumference, relatively rotates two point cloud data around a vertical axis as a center, performs a shape matching of said two point cloud data and combines said two point cloud data.

2. The laser scanner system according to claim 1, wherein said control arithmetic unit rotates the other of said point cloud data one round with respect to one of said point cloud data each time one of said point cloud data is rotated by a predetermined angle and performs the shape matching between one of said point cloud data and the other of said point cloud data.

3. The laser scanner system according to claim 2, wherein said control arithmetic unit prepares rough point cloud data with low density from said point cloud data, performs a general matching based on said rough point cloud data, sets a detailed matching range including an error in the general matching and performs a detailed shape matching only within the detailed matching range.

4. The laser scanner system according to claim 3, wherein said laser scanner has an image pickup unit, said image pickup unit acquires total circumferential images corresponding to said two point cloud data at said two points, respectively, and wherein said control arithmetic unit extracts a feature point from each of the total circumferential images, performs the general matching of the total circumferential images from said feature point, sets the detailed matching range including an error in the general matching and performs the detailed shape matching only within the detailed matching range.

5. The laser scanner system according to claim 2, wherein said laser scanner has an image pickup unit, said image pickup unit acquires total circumferential images corresponding to said two point cloud data at said two points, respectively, and wherein said control arithmetic unit extracts a feature point from each of the total circumferential images, performs the general matching of the total circumferential images from said feature point, sets the detailed matching range including an error in the general matching and performs the detailed shape matching only within the detailed matching range.

6. The laser scanner system according to claim 1, wherein said control arithmetic unit prepares rough point cloud data with low density from said point cloud data, performs a general matching based on said rough point cloud data, sets a detailed matching range including an error in the general matching and performs a detailed shape matching only within the detailed matching range.

7. The laser scanner system according to claim 6, wherein said laser scanner has an image pickup unit, said image pickup unit acquires total circumferential images corresponding to said two point cloud data at said two points, respectively, and wherein said control arithmetic unit extracts a feature point from each of the total circumferential images, performs the general matching of the total circumferential images from said feature point, sets the detailed matching range including an error in the general matching and performs the detailed shape matching only within the detailed matching range.

8. The laser scanner system according to claim 1, wherein said laser scanner has an image pickup unit, said image pickup unit acquires total circumferential images corresponding to said two point cloud data at said two points, respectively, and wherein said control arithmetic unit extracts a feature point from each of the total circumferential images, performs the general matching of the total circumferential images from said feature point, sets the detailed matching range including an error in the general matching and performs the detailed shape matching only within the detailed matching range.

9. A registration method of point cloud data comprising: a step of installing a laser scanner including a GNSS device at two arbitrary points, a step of vertically leveling said laser scanner, a step of obtaining a global coordinate value of said laser scanner at said two points by said GNSS device, a step of acquiring point cloud data from said two points, respectively, a step of converting the point cloud data into a global coordinate system based on said global coordinate value, a step of relatively rotating said two point cloud data around a vertical axis as a center, performing a shape matching of said two point cloud data and combining said two point cloud data.

* * * * *